United States Patent
Saijo et al.

(10) Patent No.: US 9,896,375 B2
(45) Date of Patent: Feb. 20, 2018

(54) COLORED GLASS

(71) Applicant: ASAHI GLASS COMPANY, LIMITED, Chiyoda-ku (JP)

(72) Inventors: Yoshitaka Saijo, Tokyo (JP); Mitsuru Wakatsuki, Tokyo (JP); Takahiro Sakagami, Shizuoka (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 695 days.

(21) Appl. No.: 14/321,129

(22) Filed: Jul. 1, 2014

(65) Prior Publication Data
US 2015/0010720 A1 Jan. 8, 2015

(30) Foreign Application Priority Data
Jul. 5, 2013 (JP) .................. 2013-141694

(51) Int. Cl.
| | |
|---|---|
| C03C 4/02 | (2006.01) |
| C03C 19/00 | (2006.01) |
| C03C 15/00 | (2006.01) |
| B44F 1/02 | (2006.01) |
| C03C 3/085 | (2006.01) |
| B44C 1/22 | (2006.01) |
| B44F 1/06 | (2006.01) |
| C03C 21/00 | (2006.01) |

(52) U.S. Cl.
CPC ............... *C03C 4/02* (2013.01); *B44C 1/221* (2013.01); *B44C 1/227* (2013.01); *B44F 1/02* (2013.01); *B44F 1/06* (2013.01); *C03C 3/085* (2013.01); *C03C 15/00* (2013.01); *C03C 19/00* (2013.01); *C03C 21/002* (2013.01); *C03C 2204/08* (2013.01); *Y10T 428/131* (2015.01); *Y10T 428/24355* (2015.01); *Y10T 428/315* (2015.01)

(58) Field of Classification Search
CPC ....... C03C 2204/08; C03C 4/02; C03C 15/00; C03C 19/00; C03C 3/085; C03C 21/002; C03C 2203/50; B44C 1/227; B44C 1/221; Y10T 428/131; Y10T 428/24355; Y10T 428/315; H05K 5/03
See application file for complete search history.

(56) References Cited

U.S. PATENT DOCUMENTS

| | | | |
|---|---|---|---|
| 8,153,270 B2 | 4/2012 | Akieda et al. | |
| 2005/0143247 A1* | 6/2005 | Siebers | .............. C03C 3/085 501/4 |
| 2009/0068404 A1 | 3/2009 | Akieda et al. | |
| 2010/0009154 A1* | 1/2010 | Allan | .............. C03C 3/085 428/220 |
| 2015/0299034 A1* | 10/2015 | Hou | .............. C03C 15/00 428/141 |

FOREIGN PATENT DOCUMENTS

JP  2009-61730  3/2009

* cited by examiner

*Primary Examiner* — Yan Lan
(74) *Attorney, Agent, or Firm* — Oblon, McClelland, Maier & Neustadt, L.L.P.

(57) ABSTRACT

A colored glass, a surface of which is roughened in whole or in part. In the colored glass, an average value of gloss values measured at 9 points in the surface thereof at an incident angle of 60° in accordance with JIS 28741 (1991) is 30 or less, a ratio of a difference between a maximum gloss value and a minimum gloss value to the maximum gloss value is 20% or less, and a minimum value of visible-light transmittance at a thickness of 0.8 mm is 70% or less.

12 Claims, 4 Drawing Sheets

COLORED GLASS

CROSS-REFERENCE TO RELATED APPLICATIONS

This application claims priority from Japanese Patent Application No. 2013-141694 filed on Jul. 5, 2013, the entire subject matter of which is incorporated herein by reference.

BACKGROUND OF THE INVENTION

Technical Field

The present disclosure relates to a glass suitably used for housings of electronic devices such as communication devices or information devices for mobile use.

Background Art

For housings or accessories of electronic devices such as cellular phones, appropriate materials are selected from materials such as resins and metals and used, in view of various factors such as decoration properties, scratch resistance, workability and cost.

In recent years, as the material of the housing, it has been tried to use a glass that has not hitherto been used (Patent Document 1). According to Patent Document 1, it is described that a transparent feeling and unique decoration effect can be exerted by forming a main body of the housing with the glass, in electronic devices such as cellular phones Patent Document 1 JP-A-2009-61730

SUMMARY OF THE INVENTION

A glass used for a housing requires decoration properties. However, when a colored glass is used for the housing, there has been a problem that appearance and texture thereof are changed by reflected colors to thereby deteriorate decoration properties. Accordingly, one aspect of the present disclosure provides a colored glass in which an influence due to the reflected colors is suppressed to have excellent decoration properties.

The present inventors have found that the influence due to the reflected colors can be effectively suppressed by adjusting a gloss value of the colored glass and a ratio of a difference between a maximum gloss value thereof and a minimum gloss value thereof to the maximum gloss value to specific ranges, thus completing the present invention.

One aspect of the present disclosure provides the following colored glass, portable electronic device, and method for producing the colored glass.

(1) A colored glass, wherein a surface of the colored glass is roughened in whole or in part, and an average value of gloss values measured at 9 points in the surface thereof at an incident angle of 60° in accordance with JIS Z8741 (1991) is 30 or less, a ratio of a difference between a maximum gloss value and a minimum gloss value to the maximum gloss value is 20% or less, and a minimum value of visible-light transmittance at a thickness of 0.8 mm is 70% or less.

(2) The colored glass according to claim 1, wherein a surface roughness Ra measured in accordance with JIS B0633 (2001) is from 0.2 to 1 μm.

(3) The colored glass according to claim 1 or 2, wherein a maximum value of an absorption coefficient to a light having a wavelength of 380 to 780 nm is 0.1 $mm^{-1}$ or more.

(4) The colored glass according to any one of claims 1 to 3, which comprises a compressive stress layer in the surface thereof.

(5) The colored glass according to any one of claims 1 to 4, which comprises at least one component selected from the group consisting of oxides of Co, Mn, Fe, Ni, Cu, Cr, V, Bi, Se, Ti, Ce, Er and Nd, as a coloring component.

(6) The colored glass according to any one of claims 1 to 5, which is configured to enclose an electronic device.

(7) The colored glass according to claim 6, wherein the electronic device is a portable electronic device.

(8) A portable electronic device, comprising the colored glass according to any one of (1) to (7), wherein the colored glass is configured to enclose the portable electronic device.

(9) A method for producing the colored glass according to any one of (1) to (7), the method comprising: a surface-roughening step of roughening a surface of a glass in whole or in part; and an etching step of etching the surface of the glass, which has been roughened in the surface-roughening step.

(10) The method according to (9), wherein the surface-roughening step comprises a polishing step using an abrasive or a sandblasting step.

(11) The method according to (9), wherein the surface-roughening step comprises a step of dipping the surface of the glass in an etching liquid.

(12) The method according to any one of (9) to (11), wherein the etching step comprises a step of dipping the surface of the glass, which has been roughened, in an etching liquid containing at least one selected from the group consisting of hydrofluoric acid (HF), hexafluorosilicic acid and buffered hydrofluoric acid.

In the colored glass of one aspect of the present disclosure, when measured at 9 points in the surface thereof, the average value of the gloss values is 30 or less, and the ratio of the difference between the maximum gloss value and the minimum gloss value to the maximum gloss value is 20% or less, thereby effectively suppressing the influence due to the reflected colors on appearance and texture to show excellent decoration properties.

DETAILED DESCRIPTION OF THE INVENTION

Colored Glass

Figure 1A:
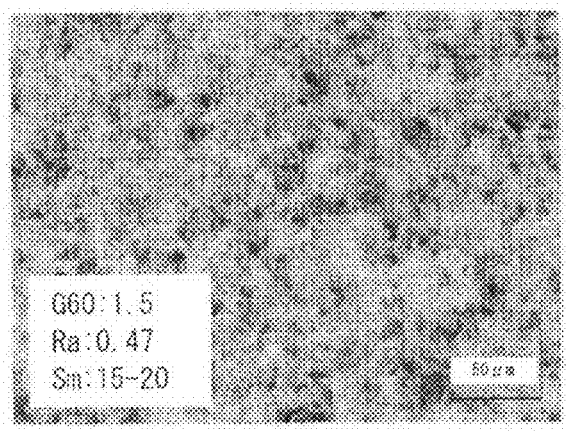
FIG. 1 shows micrographs of colored glasses in Example 1-1, taken with a laser microscope.
FIG. 1B shows micrographs of colored glasses in Example 1-2, taken with a laser microscope.
FIG. 1C shows micrographs of colored glasses in Example 1-3, taken with a laser microscope.
FIG. 1D shows micrographs of colored glasses in Example 1-4, taken with a laser microscope.
FIG. 1E shows micrographs of colored glasses in Example 1-5, taken with a laser microscope.
Figure 1B:
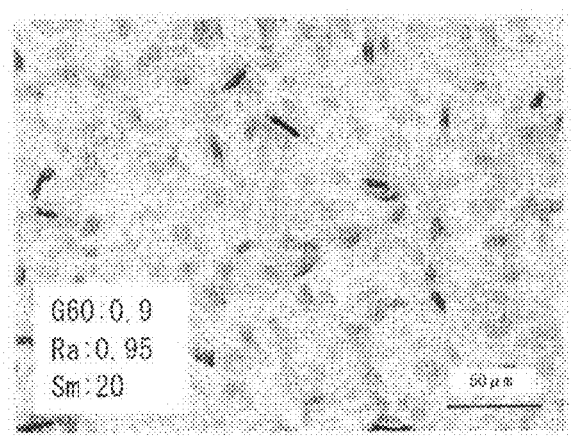
Figure 1C:
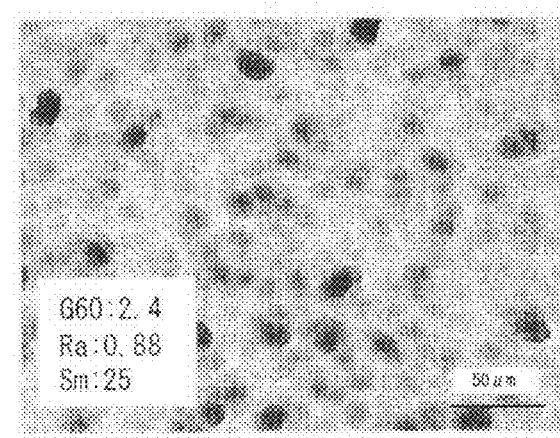
Figure 1D:
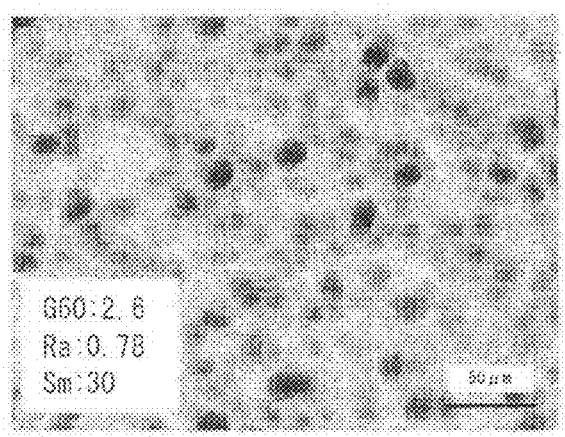
Figure 1E:
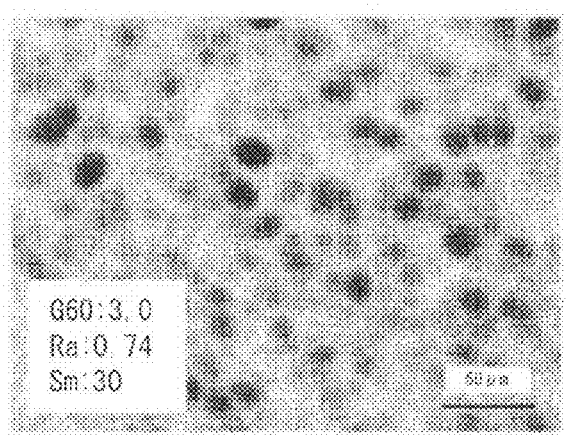

In the colored glass of one aspect of the present disclosure, the surface thereof is roughened in whole or in part, an average value of gloss values measured at 9 points in the surface thereof at an incident angle of 60° in accordance with JIS Z8741 (1991) is 30 or less, a ratio of a difference between a maximum gloss value and a minimum gloss value to the maximum gloss value is 20% or less, and a minimum value of a visible-light transmittance at a thickness of 0.8 mm is 70% or less. The visible-light transmittance in this application shall be considered to be a transmittance to a light having a wavelength of 380 to 780 nm.

In the colored glass of one aspect of the present disclosure, the average value of gloss values measured at 9 points in the surface thereof at an incident angle of 60° in accordance with JIS Z8741 (1991) is 30 or less, preferably 20 or less, and more preferably 15 or less. The lower limit of the gloss value is typically 1, although not particularly limited. In a case where the gloss value exceeds 30, texture and decoration properties are deteriorated by reflected colors.

In the colored glass of one aspect of the present disclosure, when measured at 9 points in the surface thereof, the ratio of the difference between the maximum gloss value and the minimum gloss value to the maximum gloss value is 20% or less, preferably 10% or less, and more preferably 5% or less. In a case where the ratio of the difference between the maximum gloss value and the minimum gloss value to the maximum glass value exceeds 20%, reflection unevenness occurs to thereby deteriorate texture and decoration properties.

The 9 points in the surface thereof as used herein is defined as described below. That is to say, an area in which a total of 9 equal squares are virtually closely arranged in a central portion of the colored glass and an outer periphery thereof so as to approximately coincide with the whole colored glass is used as a measurement region, and vicinities of centers of the 9 respective squares are used as measurement positions.

For example, in a case where the colored glass is square, vicinities of centers of 9 surfaces obtained by equally dividing it into 9 surfaces are used as measurement positions of the gloss values. Further, for example, in a case where the colored glass is rectangular, vicinities of centers of 9 surfaces obtained by equally dividing a measurement region of a square with sides of the length of a short side of the rectangle in a center thereof into 9 surfaces are used as measurement positions of the gloss values.

The ratio (%) of the difference between the maximum gloss value and the minimum gloss value to the maximum gloss value is a value determined by an equation [(the maximum gloss value–the minimum gloss value)/the maximum gloss value]×100, and shows in-plane distribution of the gloss values.

That is to say, the larger difference between the maximum gloss value and the minimum gloss value in the measurement region results in the larger ratio (%) of the difference between the maximum gloss value and the minimum gloss value to the maximum gloss value (hereinafter also referred to as the in-plane distribution of the gloss values).

The gloss value shows an amount reflecting specular components, and when the in-plane distribution of the gloss values is large, it is considered that the occurrence of the distribution in the specular components is reflected because of a non-uniform surface concavo-convex shape in the measurement region. Conversely, when the in-plane distribution of the gloss values is small, it is considered that the surface concavo-convex shape is nearly uniform, and the approximately equivalent specular components are produced in at least 9 measurement points. As described above, the in-plane distribution of the gloss values is considered to show the amount reflecting the distribution of the surface concavo-convex shape.

For example, in the case where measurement is made at 9 points in the surface thereof in a 50 mm square, when the in-plane distribution of the gloss values is 20% or less, the in-plane distribution of the gloss values measured at 9 points in the surface thereof in a glass smaller than the 50 mm square (for example, a 20 mm square) is 20% or less. Accordingly, in a case where measurement is made at 9 points in the surface thereof smaller than the 50 mm square, a glass having an in-plane distribution of the gloss values of 20% or less is also included in the scope of the colored glass of one aspect of the present disclosure.

The gloss value of the colored glass and the ratio of the difference between the maximum gloss value and the minimum gloss value to the maximum gloss value can be adjusted by adjusting polishing conditions or etching conditions in a surface-roughening step, a composition of an etching liquid (particularly, a hydrofluoric acid concentration in an etching liquid) in an etching step, or conditions such as an etching time and an etching treatment temperature, in a production method of the colored glass, which is described later.

In the colored glass of one aspect of the present disclosure, the minimum value of the transmittance to a light having a wavelength of 380 to 780 nm at a thickness of 0.8 mm is 70% or less, preferably 60% or less, more preferably 40% or less, still more preferably 20% or less, and most preferably 10% or less. In a case where the minimum value of the visible-light transmittance exceeds 70%, it becomes difficult to visually recognize the color, resulting in difficulty in distinguishing the colored glass from a clear and colorless glass. The lower limit of the transmittance is typically 0.1%, although not particularly limited.

In the colored glass of one aspect of the present disclosure, the surface roughness Ra measured in accordance with JTS B0633 (2001) is preferably from 0.2 to 1 µm, more preferably from 0.3 to 0.8 µm, and still more preferably from 0.3 to 0.6 µm. A decrease in strength can be prevented by adjusting the surface roughness Ra to 0.2 µm or more, whereas an influence of the reflected colors can be suppressed by adjusting it to 1 µm or less.

In the colored glass of one aspect of the present disclosure, the maximum value of the absorption coefficient to a light having a wavelength of 380 to 780 nm is preferably 0.1 $mm^{-1}$ or more, more preferably 0.2 $mm^{-1}$ or more, still more preferably 0.4 $mm^{-1}$ or more, particularly preferably 0.8 $mm^{-1}$ or more, and most preferably 1.2 $mm^{-1}$ or more. It can be recognized to be the colored glass by adjusting the maximum value of the absorption coefficient to a light having a wavelength of 380 to 780 nm to 0.1 $mm^{-1}$ or more.

The colored glass of one aspect of the present disclosure may be chemically strengthened by an ion-exchange treatment to provide high strength. The colored glass may be subjected to the ion-exchange treatment after the surface-roughening treatment.

The chemical strengthening is a method of forming a compressive stress layer in a glass surface, thereby increasing the glass strength. Specifically, it is a treatment in which alkali metal ions having a smaller ion radius (typically, Li ions or Na ions) in a surface of a glass sheet are exchanged with alkali metal ions having a larger ion radius (typically, Na ions or K ions for Li ions, and K ions for Na ions) by ion exchange at a temperature equivalent to or lower than the glass transition temperature thereof.

A chemical strengthening method is not particularly limited as long as $Li_2O$ or $Na_2O$ in the glass surface layer can be ion-exchanged with $Na_2O$ or $K_2O$ in a molten salt, and examples thereof include a method of dipping the glass in a heated potassium nitrate ($KNO_3$) molten salt.

Although conditions for forming the chemically strengthened layer (surface compressive stress layer) having a desired surface compressive stress in the glass vary depending on the thickness of the glass, the temperature is preferably from 350 to 550° C., and more preferably from 400 to 500° C. Further, the chemical strengthening time is preferably from 0.5 to 144 hours, and more preferably from 0.5 to 24 hours. Examples of the molten salts include, for example, $KNO_3$ and $NaNO_3$. Specifically, for example, the glass is dipped in the $KNO_3$ molten salt of 400 to 550° C. for 2 to 24 hours.

In the surface-roughening step of the glass, microcracks are sometimes formed by performing the surface-roughening by means of a physical technique. In order to make an effect of improving the strength by the chemical strengthening effective, it is preferred to have the surface compressive stress layer having a thickness larger than the microcracks formed on the glass surface, and the thickness of the surface compressive stress layer produced by the chemical strengthening is preferably 6 µm or more. Further, during use, the occurrence of a crack having a depth exceeding the thickness of the surface compressive stress layer leads to breakage of the glass, so that the larger the surface compressive stress layer is, the better it is. The thickness thereof is preferably 10 µm or more, more preferably 15 µm or more, still more preferably 20 µm or more, and typically 30 µm or more.

On the other hand, in a case where the thickness of the surface compressive stress layer is too large, internal tensile stress increases to cause an increase in impact at the time of breakage. That is to say, in the case where the internal tensile stress is high, the glass tends to be shattered to small pieces and scattered when it is broken. In the glass having a thickness of 2 mm or less, in a case where the thickness of the surface compressive stress layer exceeds 70 µm, scattering of the small pieces at the time of breakage of the glass becomes significant.

Accordingly, in the colored glass having the compressive stress layer, the thickness of the surface compressive stress layer is preferably 70 µm or less. In a case where the chemically strengthened glass of one aspect of the present disclosure is used as a housing, the thickness of the surface compressive stress layer may be reduced for safety, for example, in use for a panel in which a surface of the housing has a high probability of being scratched by contact, although depending on an electronic device to be enclosed by the glass. The thickness of the surface compressive stress layer is more preferably 60 µm or less, still more preferably 50 µm or less, and typically 40 µm or less.

The tensile stress of the colored glass having the compressive stress layer is preferably 50 MPa or less, more preferably 45 MPa or less, still more preferably 40 MPa or less, and most preferably 30 MPa or less. The tensile stress is calculated from the equation "(the surface compressive stress value×the thickness of the surface compressive stress layer)/(the thickness of the chemically strengthened glass−2×the thickness of the compressive stress layer)".

For example, in a case where the sodium component in the glass surface layer is ion-exchanged with the potassium component in the molten salt in the ion exchange treatment, alkali ion concentration analysis (in the case of this example, potassium ion concentration analysis) in a depth direction of the glass is performed with an EPMA (electron probe micro analyzer), and the potassium ion diffusion depth obtained by the measurement is taken as the thickness of the surface compressive stress layer.

Further, the lithium component in the glass surface layer is ion-exchanged with the sodium component in the molten salt in the ion exchange treatment, sodium ion concentration analysis in a depth direction of the glass is performed with the EPMA, and the sodium ion diffusion depth obtained by the measurement is taken as the thickness of the surface compressive stress layer.

The thickness of the surface compressive stress layer of the colored glass having the compressive stress layer and the surface compressive stress value can be measured using the EPMA, a surface stress meter (for example, FSM-6000 manufactured by Orihara Manufacturing Co., Ltd.) or the like.

(Composition of Colored Glass)

The colored glass of one aspect of the present disclosure preferably contains, as represented by mole percentage based on oxides, 0.1 to 7% of a coloring component (at least one component selected from the group consisting of oxides of Co, Mn, Fe, Ni, Cu, Cr, V, Bi, Se, Ti, Ce, Er and Nd), thereby making it possible to recognize the glass as the colored glass.

As the coloring component (at least one component selected from the group consisting of oxides of Co, Mn, Fe, Ni, Cu, Cr, V, Bi, Se, Ti, Ce, Er and Nd), specific examples thereof include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$ or $Nd_2O_3$.

As for these coloring components, it is only necessary to contain any one of these components as long as the total content thereof is from 0.1 to 7%. However, in a case where the content of each component is less than 0.001%, an effect of the coloring component may not be sufficiently obtained. It is preferably 0.1% or more, and more preferably 0.2% or more. Further, in a case where the content of each component exceeds 7%, the glass becomes unstable to cause devitrification. It is preferably 5% or less, and more preferably 4% or less.

Examples of the colored glasses of one aspect of the present disclosure include glasses containing, as represented by mole percentage based on the following oxides, 55 to 80% of $SiO_2$, 0 to 16% of $Al_2O_3$, 0 to 12% of $B_2O_3$, 5 to 20% of $Na_2O$, 0 to 8% of $K_2O$, 0 to 15% of MgO, 0 to 15% of CaO, 0 to 18% of ΣRO (R is Mg, Ca, Sr, Ba or Zn) and 0 to 5% of $ZrO_2$, together with the above-mentioned coloring component(s).

The composition of the glass other than the coloring components in the colored glass of one aspect of the present disclosure is described below using the content represented by the mole percentage, unless otherwise specified.

$SiO_2$ is a component for forming a network of the glass, and is essential. In a case where the content thereof is less than 55%, stability may be deteriorated, or weather resistance may be deteriorated. It is preferably 60% or more, and more preferably 65% or more. In a case where the content of $SiO_2$ exceeds 80%, the viscosity of the glass may be increased to significantly deteriorate melting properties. It is preferably 75% or less, and typically 70% or less.

$Al_2O_3$ is a component for improving the weather resistance of the glass and chemical strengthening characteristics, and may be contained as needed, although not essential. In a case where the content thereof is less than 1%, the weather resistance may be deteriorated. It is preferably 2% or more, and typically 3% or more.

In a case where the content of $Al_2O_3$ exceeds 16%, the viscosity of the glass is increased, resulting in a difficulty of homogeneous melting. It is preferably 14% or less, and typically 12% or less.

$B_2O_3$ is a component for improving the weather resistance of the glass, and may be contained as needed, although not essential. In the case of containing $B_2O_3$, in a case where the content thereof is less than 4%, a significant effect might not be obtained for an improvement in the weather resistance. It is preferably 5% or more, and typically 6% or more.

In a case where the content of $B_2O_3$ exceeds 12%, striae due to volatilization occur to cause a possibility to decrease the yield. It is preferably 11% or less, and typically 10% or less.

$Na_2O$ is a component for improving the melting properties of the glass, and is essential for forming the surface compressive stress layer by ion exchange. In a case where the content thereof is less than 5%, the melting properties may be deteriorated, and it becomes difficult to form the desired surface compressive stress layer by ion exchange. It is preferably 7% or more, and typically 8% or more.

In a case where the content of $Na_2O$ exceeds 20%, the weather resistance may be deteriorated. It is preferably 18% or less, and typically 17% or less.

$K_2O$ is a component for improving the melting properties of the glass, and has an action of increasing the ion-exchange rate in the chemical strengthening. This is therefore a component that is preferred to be contained although not essential. In the case of containing $K_2O$, in a case where the content thereof is less than 0.01%, a significant effect may not be obtained for an improvement in the melting properties, or a significant effect may not be obtained for an improvement in the ion-exchange rate. It is typically 0.1% or more. When the content of $K_2O$ exceeds 8%, the weather resistance may be deteriorated. It is preferably 6% or less, and typically 5% or less.

MgO is a component for improving the melting properties of the glass, and may be contained as needed, although not essential. In the case of containing MgO, in a case where the content thereof is less than 3%, a significant effect might not be obtained for an improvement in the melting properties. It is typically 4% or more. In a case where the content of MgO exceeds 15%, the weather resistance may be deteriorated. It is preferably 13% or less, and typically 12% or less.

CaO is a component for improving the melting properties of the glass, and may be contained as needed, although not essential. In the case of containing CaO, in a case where the content thereof is less than 0.01%, a significant effect may not be obtained for an improvement in the melting properties. It is typically 0.1% or more. In a case where the content of CaO exceeds 15%, the chemical strengthening characteristics may be deteriorated. It is preferably 13% or less, and typically 12% or less. It is preferred that CaO is not substantially contained.

RO (R represents Mg, Ca, Sr, Ba or Zn) is a component for improving the melting properties of the glass, and may contain any one or more thereof as needed, although not essential. In that case, in a case where the total content of RO, i.e. $\Sigma RO$ (R represents Mg, Ca, Sr, Ba or Zn), is less than 1%, the melting properties might be deteriorated. It is preferably 3% or more, and typically 5% or more. In a case where $\Sigma RO$ (R represents Mg, Ca, Sr, Ba or Zn) exceeds 18%, the weather resistance may be deteriorated. It is preferably 15% or less, more preferably 13% or less, and typically 11% or less.

$ZrO_2$ is a component for increasing the ion-exchange rate, and may be contained in an amount of 5% or less, although not essential. In a case where the content of $ZrO_2$ is 5% or less, there is no concern that the melting properties are deteriorated to cause $ZrO_2$ to remain as unmelted matter in the glass.

Various methods can be adopted for the formation of the glass. Examples thereof include various forming methods such as downdraw processes (for example, an overflow downdraw process, a slot down process and a redrawing process), float processes, rollout processes and pressing processes.

(Method for Producing Colored Glass)

A method for producing the colored glass of one aspect of the present disclosure includes a surface-roughening step of roughening a glass surface in whole or in part and an etching step of etching the glass surface which has been roughened in the surface-roughening step.

(1) Surface-Roughening Step

Examples of processing methods for roughening the glass surface in whole or in part in the surface-roughening step include, for example, physical techniques such as sandblasting and loose grain polishing using a polishing agent and chemical techniques of dipping the glass in an etching liquid, and these methods can be appropriately selected depending on the desired gloss value, the glass composition and the like.

Specifically, for example, in a case where the total content of the coloring components in the glass composition is less than 2%, the chemical technique is preferably used. Even when the total content of the coloring components in the glass composition is 2% or more, the chemical technique can be applied, but it becomes difficult to obtain uniformity by the chemical technique, so that the physical technique is preferably used.

[Physical Technique]

In a case where the sand blasting is applied in the surface-roughening step, the particle size of an abrasive used is, based on particle size in accordance with JIS R6001, preferably from #100 to #5000, more preferably from #300 to #3000 and still more preferably from #600 to #1000. The glass surface can be effectively roughened by adjusting the particle size of the abrasive to #100 or more. Further, a large crack is less likely to occur in the glass surface, so that the decrease in the mechanical strength of the glass can be suppressed. The necessary concavities and convexities can be given to the glass surface by adjusting the particle size of the abrasive to #5000 or less.

Specifically, for example, in the case of desiring the colored glass having a gloss value of 5 to 10, the particle size of the abrasive is adjusted preferably to #100 to #2000, and more preferably to #300 to #1000. Further, in the case of desiring the colored glass having a gloss value of 10 to 20, the particle size of the abrasive is adjusted preferably to #500 to #3000, and more preferably to π1000 to #3000.

In a case where the loose grain polishing is applied in the surface-roughening step, examples of the polishing agents used include, for example, silicon carbide (SiC), alumina ($Al_2O_3$), zirconia ($ZrO_2$) and diamond (C). The particle size of the polishing agent is preferably from #100 to #5000, and more preferably from #500 to #3000. Examples of grinding stones include, for example, one obtained by solidifying silicon carbide, alumina or diamond with a resin or the like.

Specifically, for example, in the case of desiring the colored glass having a gloss value of 5 to 10, the particle size of the abrasive is adjusted preferably to #100 to #2000, and more preferably to #300 to #1000. Further, in the case of desiring the colored glass having a gloss value of 10 to 20, the particle size of the abrasive is adjusted preferably to #500 to #3000, and more preferably to #1000 to #3000.

[Chemical Technique]

In a case where the chemical technique is applied in the surface-roughening step, it is preferred to conduct a pre-etching step before the surface-roughening step, for the purposes of cleaning a sample surface and improving hydrophilicity thereof. As an etching liquid used in the pre-etching step, a solution containing at least one selected from the group consisting of hydrofluoric acid (HF), hexafluorosilicic acid, ammonium hydrogen fluoride and ammonium fluoride is preferred. Typically, an etching liquid containing hydrofluoric acid is used.

Examples of the etching liquids containing hydrofluoric acid include, for example, hydrofluoric acid, an acidic solution mainly containing hydrofluoric acid and a mixed acid containing at least one acid of sulfuric acid, acetic acid, hydrochloric acid, phosphoric acid, nitric acid and hydrofluorosilicic acid with hydrofluoric acid. In particular, an etching liquid containing hydrofluoric acid, ammonium fluoride and an organic acid such as acetic acid is preferred. The content of hydrofluoric acid in the etching liquid is preferably from 0.1 to 10% by mass, and more preferably from 1 to 5% by mass.

The etching rate in the pre-etching step is preferably from 0.01 to 10 $\mu m/cm^2/min$, more preferably from 0.05 to 5 $\mu m/cm^2/min$, and still more preferably from 0.1 to 1 $\mu m/cm^2/min$. By adjusting the etching rate to 0.01 $\mu m/cm^2/min$ or more, the glass surface is dissolved, which makes it possible to remove foreign matters and hydrophilize the glass surface. The etching rate is adjustable by appropriately varying the glass composition, the temperature or concentration of the etching liquid, or the like.

The etching temperature in the pre-etching step is preferably from 20 to 60° C., and more preferably from 30 to 40° C. By adjusting the etching temperature in the pre-etching step to 20° C. or more, etching of the glass surface proceeds, which makes it possible to remove foreign matters and hydrophilize the glass surface. Further, by adjusting the temperature to 60° C. or less, excessive volatilization of the etching liquid can be prevented.

The etching time in the pre-etching step is preferably from 0.1 to 5 minutes, and more preferably from 0.1 to 1 minute. By adjusting the etching time in the pre-etching step to 0.1 minutes or more, etching of the glass surface proceeds, which makes it possible to remove foreign matters and hydrophilize the glass surface. By adjusting the time to 5 minutes or less, an unnecessary decrease of working efficiency can be prevented A salt is allowed to be deposited on the glass surface by treatment with an etching liquid obtained by adding potassium fluoride, ammonium fluoride or glass cullet to hydrofluoric acid, after the pre-etching step, thereby obtaining the roughened glass surface. The content of hydrofluoric acid in the etching liquid is preferably from 1 to 40% by mass, and more preferably from 5 to 30% by mass.

Attached matters are sometimes attached to the surface of the glass sheet after the etching, so that it is preferred to clean the glass sheet after the treatment. A cleaning method is not particularly limited, and a conventional method can be used. For example, cleaning can be performed with pure water or an aqueous solution of sulfuric acid, hydrochloric acid, nitric acid or the like in a state where ultrasonic waves are applied.

The surface roughness Ra of the glass surface roughened by the surface-roughening step is preferably from 0.2 to 1 and more preferably from 0.3 to 0.8 $\mu m$. The surface roughness Ra of the glass surface roughened by the surface-roughening step is measured in accordance with JIS B0633 (2001). By adjusting the surface roughness Ra of the glass surface roughened by the surface-roughening step within the range of 0.2 to 1 $\mu m$, the treating time in the etching step performed after the surface-roughening step can be shortened, thereby being able to prevent the occurrence of unevenness.

The surface roughness Ra of the glass surface roughened by the surface-roughening step can be appropriately adjusted by the kind or particle size of abrasive or polishing agent in a case where the glass surface is roughened by the physical technique, or by etching conditions such as the composition of the etching liquid and the etching rate in a case where the glass surface is roughened by the chemical technique.

(2) Etching Step

As the etching liquid used in the etching step, an etching liquid containing hydrofluoric acid is preferred. By performing the etching using the etching liquid containing hydrofluoric acid, the uniform treated surface can be obtained even when the treating time is shortened, thereby being able to prevent the occurrence of unevenness.

An etching liquid obtained by adding, for example, a strong acid such as sulfuric acid, nitric acid, hydrochloric acid, phosphoric acid or an organic acid such as citric acid to hydrofluoric acid may be used. By adding the strong acid to hydrochloric acid, uniformity can be more improved. The etching treatment in the etching step may be performed in a state where ultrasonic waves are applied.

The etching rate in the etching step is preferably 0.5 $\mu m/cm^2/min$ or more, more preferably 1 $\mu m/cm^2/min$, and still more preferably 3 $\mu m/cm^2/min$ or more. By adjusting the etching rate to 0.5 $\mu m/cm^2/min$ or more, the roughened surface is smoothened, thereby being able to obtain desired surface characteristics. The etching rate is adjustable by appropriately varying the composition of the glass, the temperature or concentration of the etching liquid, or the like.

The etching temperature in the etching step is preferably from 20 to 60° C., and more preferably from 25 to 40° C. By adjusting the etching temperature to 20° C. or more, it is possible to allow the etching reaction to sufficiently proceed. By adjusting the etching temperature to 60° C. or less, it is possible to prevent excessive volatilization of the etching liquid.

The etching time in the etching step is preferably from 0.1 to 30 minutes, and more preferably from 0.5 to 10 minutes. By adjusting the etching time in the etching step to 0.1 minutes or more, it is possible to obtain desired surface characteristics. By adjusting the etching time to 30 minutes or less, a decrease in unnecessary working efficiency can be prevented, and this step can be applied as a mass-production step. It is preferred to clean the glass sheet after the etching, as is the case with the surface—roughening step.

By adjusting conditions such as the composition of the etching liquid (particularly, the concentration of hydrofluoric acid in the etching liquid) and the etching time in the etching step, the gloss value of the colored glass can be adjusted.

(Use)

The colored glass of one aspect of the present disclosure can be suitably used in outer housings of portable electronic devices. The portable electronic device is a concept including portably usable communication devices and information devices. For example, examples of the communication devices include cellular phones, PHS (Personal Handyphone System), smart phones, PDA (Personal Data Assistance) and PND (Portable Navigation Device, Portable Car Navigation System) as communication terminals, and portable radios, portable televisions, One Seg receivers and the like as broadcasting receivers.

Further, examples of the information devices include digital cameras, video cameras, portable music players, sound recorders, portable DVD players, potable game machines, notebook computers, tablet PCs, electronic dictionaries, electronic diaries, electronic book readers, portable printers, portable scanners and the like. Furthermore, the colored glass of one aspect of the present disclosure is also available for stationary electronic devices or electronic devices installed in automobiles. The uses of the colored glass of one aspect of the present disclosure are not limited to these examples. These portable electronic devices can be provided with high strength and fine appearance by using the colored glass of one aspect of the present disclosure.

EXAMPLES

The present invention will be described in detail below based on examples of the present invention. However, the present invention should not be construed as being limited to only these examples.
[Analytical Method]
The physical properties of the colored glass were analyzed by the following methods.
(1) Gloss Value
The gloss value was measured with a gloss meter (manufactured by Horiba, Ltd., model: IG-410) in accordance with JIS Z8741 (1991).
(2) Uniformity
The colored glass was visually evaluated by the following criteria:
  4: No unevenness is visually observed.
  3: Slight unevenness is observed at only a very small part in a surface.
  2: Unevenness is observed in a surface.
  1: Unevenness is clearly observed in a surface.
(3) Surface Roughness Ra
The surface roughness was measured with a laser microscope (manufactured by Keyence Corporation, model: VK8550) in accordance with JIS B0633 (2001).
(4) Sm
Sm was determined by measuring the average distance (μm) of concavities and convexities on the glass surface with any line from a profile of a laser microscope (manufactured by Keyence Corporation, model: VK8550).
(5) Absorption Coefficient
The maximum value of the absorption coefficient at a wavelength of 380 to 780 nm was determined by using the following equation (I) from the transmittance measured with a spectrophotometer (manufactured by JASCO Corporation, model: V-570).

$$\text{Absorption coefficient (mm}^{-1}) = (-\log 10(I/100) - 0.03621)/L \quad (1)$$

wherein I is the transmittance (%), L is the thickness (mm) of the glass, and −0.3621 is a correction term taking surface reflection into consideration when the reflectance of the glass is assumed to be 4%.
(6) Transmittance
The transmittance to a light having a wavelength of 380 to 780 nm was measured with a spectrophotometer (manufactured by JASCO Corporation, model: V-570).

Example 1

Production of Colored Glass

Glass raw materials generally used, such as oxides, hydroxides, carbonates and nitrates, were appropriately selected so as to give the composition shown in Table 1, as represented by mole percentage, and weighed so as to become 100 ml as a glass. $SO_3$ in the composition in Table 1 is residual $SO_3$ remaining in the glass after decomposition of sodium sulfate ($Na_2SO_4$) added to the glass raw materials, and the value thereof is the calculated value.

TABLE 1

| [mol %] | |
| --- | --- |
| $SiO_2$ | 62.0 |
| $B_2O_3$ | — |
| $Na_2O$ | 12.1 |
| $K_2O$ | 3.9 |
| $MgO$ | 10.1 |
| $CaO$ | — |
| $BaO$ | — |
| $SrO$ | — |
| $Al_2O_3$ | 7.7 |
| $TiO_2$ | — |
| $ZrO_2$ | 0.5 |
| $CeO_2$ | — |
| $Co_3O_4$ | 0.39 |
| $Fe_2O_3$ | 3.28 |
| $Er_2O_3$ | — |
| $Nd_2O_3$ | — |
| $SO_3$ | 0.1 |
| $NiO$ | — |
| $MnO_2$ | — |
| $CuO$ | — |

Then, this raw material mixture was placed in a platinum crucible, and put into a resistance heating electric furnace of 1500 to 1600° C. After melted down by heating for about 0.5 hours, the raw material mixture was melted for 1 hour, and defoamed. Thereafter, it was poured into a mold with dimensions of about 50 mm×about 100 mm×about 20 mm high, which was preheated to about 300° C., and slowly cooled at a rate of about 1° C./min to obtain a glass block. This glass block was cut to a size of 50 mm×50 mm×1.0 mm thick, and thereafter ground. Finally, both surfaces thereof were mirror polished to obtain a sheet-like glass.

The colored glass thus obtained was treated in the surface-roughening step and the etching step in this order under the various conditions shown in Table 2 to obtain colored glasses of Examples 1-1 to 1-5. Example 1-1 is a comparative example, and Examples 1-2 to 1-5 are examples according to the present invention. The surface-roughening step was performed using the physical technique and a polishing agent of #1000. As for the confirmation of a surface state after the surface-roughening step, it was visually confirmed that the whole surface was uniformly processed.

The evaluation results of Examples 1-1 to 1-5 are shown in Table 2. Further, micrographs of the colored glasses of Examples 1-1 to 1-5 taken with a laser microscope are shown in FIGS. 1A to 1E.

TABLE 2

| | Surface-Roughening Step | Etching Step | G60 | Ra (nm) | Sm (μm) |
|---|---|---|---|---|---|
| Example 1-1 | Hand Polishing with #1000 | Not used | 1.5 | 0.47 | 15-20 |
| Example 1-2 | Hand Polishing with #1000 | At 20° C. for 1 min with 5 mass % of HF | 0.9 | 0.95 | 20 |
| Example 1-3 | Hand Polishing with #1000 | At 20° C. for 3 min with 5 mass % of HF | 2.4 | 0.88 | 25 |
| Example 1-4 | Hand Polishing with #1000 | At 20° C. for 1 min with 5 mass % of HF + 10 mass % of $H_2SO_4$ | 2.6 | 0.78 | 30 |
| Example 1-5 | Hand Polishing with #1000 | At 20° C. for 3 min with 5 mass % of HF + 10 mass % of $H_2SO_4$ | 3.0 | 0.74 | 30 |

It was found that many dents having a spoon-cut shape were formed, as shown in FIGS. 1A to 1E, by performing the etching step of dipping the glass in the etching liquid after the surface-roughening step of polishing the glass with the polishing agent, and that the gloss value and the Sm were increased, as shown in Table 2, by increasing the treating time of etching.

Figure 2:
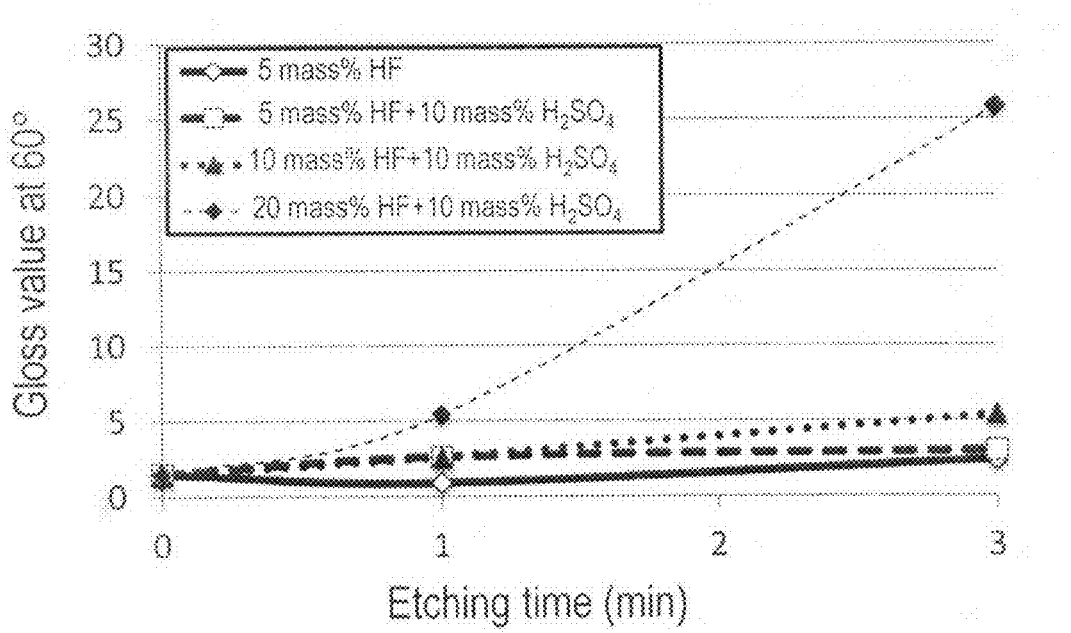
FIG. 2 is a graph showing the results obtained by measuring the gloss value with varying the content of HF in an etching liquid and the time of etching treatment.

The results obtained by measuring the gloss value with varying the content of HF in the etching liquid and the treating time of etching are shown in FIG. 2. As shown in FIG. 2, it was found that the gloss value was increased by increasing the content of HF in the etching liquid.

Figure 3:
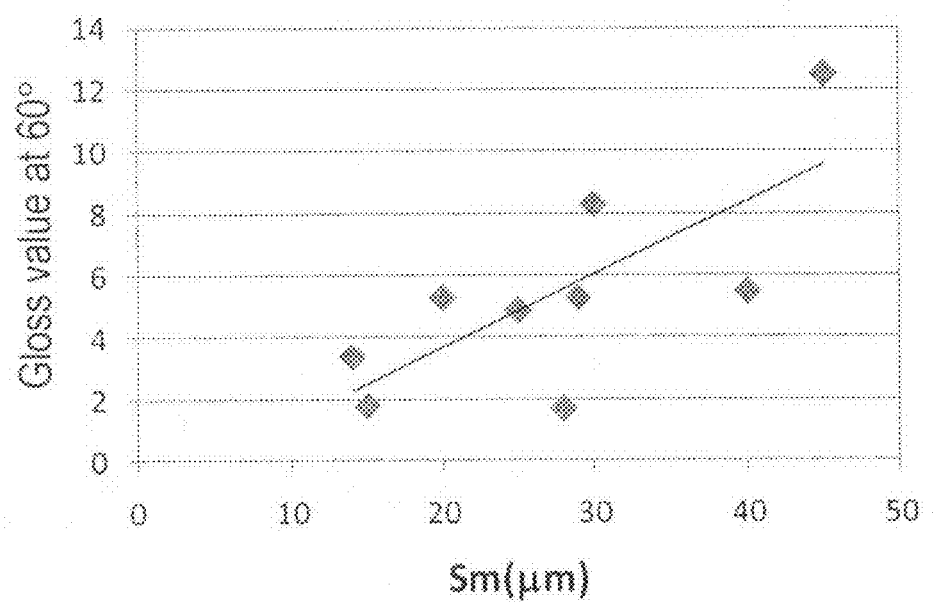
FIG. 3 is a graph showing a correlation between Sm and the gloss value at an incident angle 60°.

A correlation between the Sm and the gloss value at 60° is shown in FIG. 3. As shown in FIG. 3, it was found that there was a correlation (correlation coefficient: 0.7) between the Sm and the gloss value.

Example 2

Production of Colored Glass

Glass raw materials generally used, such as oxides, hydroxides, carbonates and nitrates, were appropriately selected so as to give the compositions shown in Table 3, as represented by mole percentage, and weighed so as to become 100 ml as each glass. $SO_3$ in the compositions in Table 3 is residual $SO_3$ remaining in the glass after decomposition of sodium sulfate ($Na_2SO_4$) added to the glass raw materials, and the value thereof is the calculated value.

TABLE 3

| [mol %] | A | B | C | D | E | F | G |
|---|---|---|---|---|---|---|---|
| $SiO_2$ | 62.0 | 63.5 | 69.4 | 71.4 | 70.9 | 63.1 | 71.2 |
| $B_2O_3$ | — | — | — | — | — | — | — |
| $Na_2O$ | 12.1 | 13.5 | 16.5 | 14.5 | 15.4 | 12.3 | 16.6 |
| $K_2O$ | 3.9 | 2.9 | 0.2 | 0.2 | 0.2 | 3.9 | 0.2 |
| MgO | 10.1 | 7.2 | 9.4 | 9.4 | 5.4 | 10.3 | 8.5 |
| CaO | — | — | — | — | 2.6 | — | — |
| BaO | — | — | — | — | — | — | — |
| SrO | — | — | — | — | — | — | — |
| $Al_2O_3$ | 7.7 | 8.7 | 3.1 | 3.1 | 4.0 | 7.9 | 3.1 |
| $TiO_2$ | — | — | — | — | — | 0.25 | — |
| $ZrO_2$ | 0.5 | 0.5 | — | — | — | 0.4 | — |
| $CeO_2$ | — | — | — | — | — | — | — |
| $Co_3O_4$ | 0.39 | 0.37 | 0.01 | 0.01 | 0.02 | 0.05 | 0.002 |
| $Fe_2O_3$ | 3.28 | 3.28 | — | — | — | — | — |
| $Er_2O_3$ | — | — | — | — | — | — | — |
| $Nd_2O_3$ | — | — | — | — | — | — | — |
| $SO_3$ | 0.1 | 0.1 | 0.1 | 1.0 | 0.1 | 0.1 | 0.1 |

TABLE 3-continued

| [mol %] | A | B | C | D | E | F | G |
|---|---|---|---|---|---|---|---|
| NiO | — | — | 0.6 | 0.55 | 0.44 | 0.69 | 0.14 |
| $MnO_2$ | — | — | — | — | — | — | — |
| CuO | — | — | 0.7 | 0.74 | 0.94 | 0.98 | 0.13 |
| Minimum value of transmittance (%) (380-780 nm) | 0.01 | <0.01 | 12.6 | 12.9 | 10.7 | 4.0 | 56.9 |
| Maximum value of absorption coefficient ($mm^{-1}$) (380-780 nm) | 4.96 | 4.82 | 1.08 | 1.07 | 1.17 | 1.7 | 0.26 |

Then, each of these raw material mixtures was placed in a platinum crucible, and put into a resistance heating electric furnace of 1500 to 1600° C. After melted down by heating for about 0.5 hours, each of the raw material mixtures was melted for 1 hour, and defoamed. Thereafter, it was poured into a mold with dimensions of about 50 mm×about 100 mm×about 20 mm high, which was preheated to about 300° C., and slowly cooled at a rate of about 1° C./min to obtain each of glass blocks. Each of these glass blocks was cut so as to have a thickness of 1.0 mm, and thereafter ground. Finally, both surfaces thereof were mirror polished to obtain each of sheet-like glasses.

The colored glasses thus obtained were treated in the surface-roughening step under the conditions shown in Tables 4 to 7 to obtain colored glasses of Examples 2-1, 2-6, 2-11, 2-18, 2-23, 2-34, 2-44 and 2-48. Also, the colored glasses thus obtained were treated in the surface-roughening step and the etching step in this order under the conditions shown in Tables 4 to 11 to obtain colored glasses of Examples 2-2 to 2-5, 2-7 to 2-10, 2-12 to 2-17, 2-19 to 2-22, 2-24 to 2-33, 2-35 to 2-43, 2-45 to 2-47 and 2-49 to 2-121. The treatment temperature in the etching step was room temperature (for example, 20 to 25° C.). Examples 2-1 to 2-9, 2-11 to 2-31 and 2-33 to 2-121 are examples according to the present invention, and Examples 2-10 and 2-32 are comparative examples.

Furthermore, the glasses thus obtained were treated by etching treatments (1) to (3) in this order under the conditions shown in Tables 12 and 13 to obtain colored glasses of Examples 2-122 to 2-144. The treatment temperature in etching treatments (1) to (3) was room temperature (for example, 20 to 25° C.). Examples 2-122 to 2-124 and 2-131 to 2-144 are examples according to the present invention, and Examples 2-125 to 2-130 are comparative examples.

Figure 4:
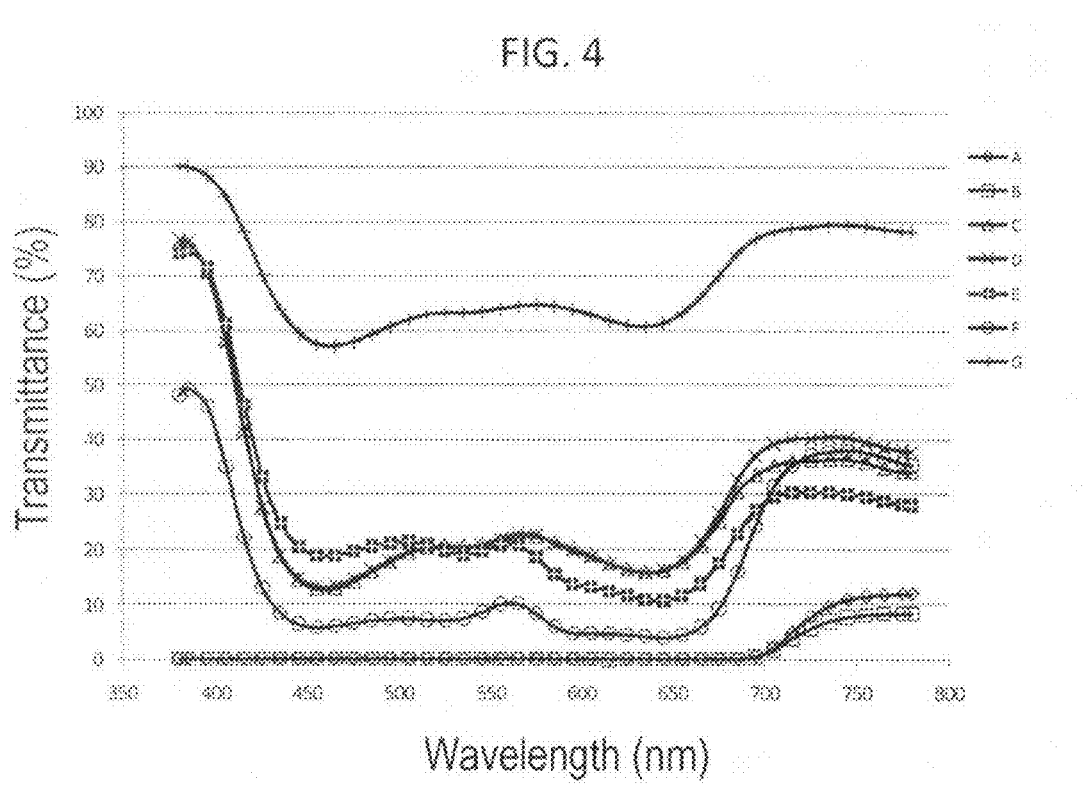
FIG. 4 is a graph showing the visible-light transmittance of typical colored glasses
Figure 5:
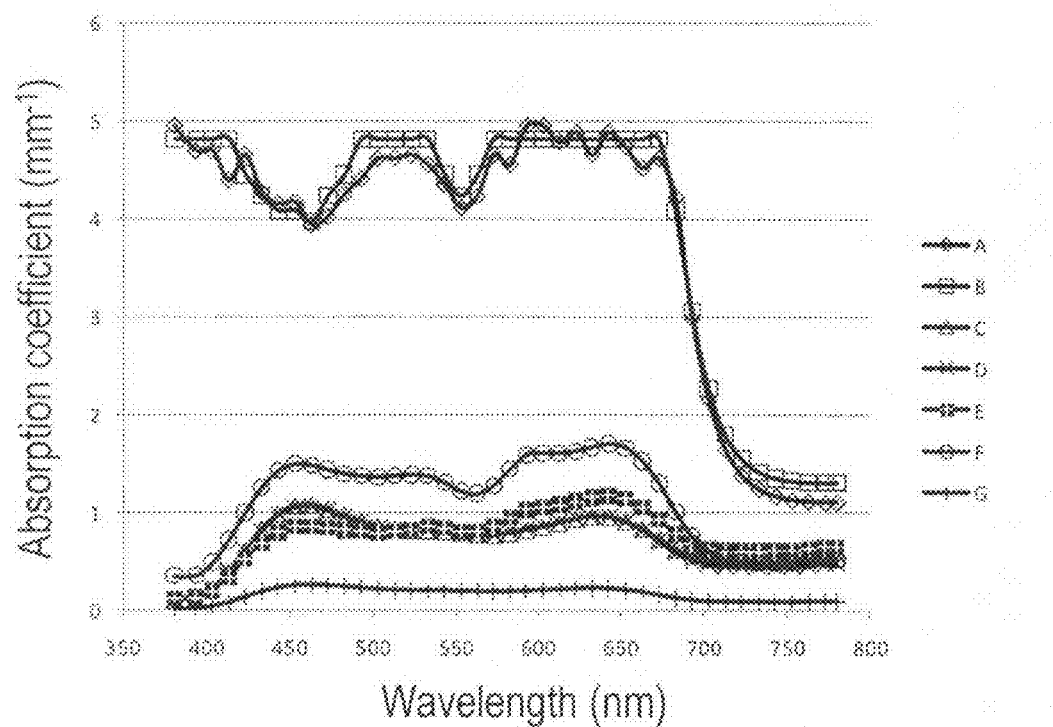
FIG. 5 is a graph showing the absorption coefficient of typical colored glasses.

The results obtained by evaluating the colored glasses of Examples 2-1 to 2-144 are shown in Tables 4 to 13. "-" indicates that dada was not measured or that evaluation was not performed. As for the colored glasses of Examples 2-1 to 2-144, the minimum value of the transmittance to a light having a wavelength of 380 to 780 nm was 70% or less. The visible-light transmittance and the absorption coefficient, of the typical colored glasses are shown in FIGS. 4 and 5. "n/a" indicates that when the absolute value of the gloss value is small, the error of the calculated value of the gloss difference is not negligible, from the fact that the display resolution of the measuring instrument is 0.1 and that the repeatability is ±1.

TABLE 4

| | Glass composition | Surface-roughening step | Etching Step | | | Gloss 60° | | | | Size (mm) | Uniformity | Ra (μm) | Sm (μm) |
|---|---|---|---|---|---|---|---|---|---|---|---|---|---|
| | | | HF (mass %) | H$_2$SO$_4$ (mass %) | Time (min) | Maximum | Average value | Minimum | Difference % | | | | |
| Ex. 2-1 | A | #1000 | — | — | — | 2 | 2 | 2 | 0 | — | 3 | 0.48 | 15-20 |
| Ex. 2-2 | A | #1000 | 5 | 0 | 1 | 1 | 1 | 1 | 0 | — | 3 | 0.95 | 20 |
| Ex. 2-3 | A | #1000 | 5 | 0 | 3 | 2 | 2 | 2 | 0 | — | 3 | 0.88 | 25 |
| Ex. 2-4 | A | #1000 | 5 | 10 | 1 | 3 | 3 | 3 | 0 | — | 3 | 0.79 | 30 |
| Ex. 2-5 | A | #1000 | 5 | 10 | 3 | 3 | 3 | 3 | 0 | — | 3 | 0.74 | 30 |
| Ex. 2-6 | A | #1000 | — | — | — | 2 | 2 | 2 | 0 | — | — | 0.48 | 20 |
| Ex. 2-7 | A | #1000 | 10 | 10 | 1 | 3 | 3 | 3 | 0 | — | 3 | 0.79 | 25 |
| Ex. 2-8 | A | #1000 | 10 | 10 | 3 | 5 | 5 | 5 | 0 | — | 3 | 0.64 | 40 |
| Ex. 2-9 | A | #1000 | 20 | 10 | 1 | 5 | 5 | 5 | 0 | — | 3 | 0.58 | 40 |
| Ex. 2-10 | A | #1000 | 20 | 10 | 3 | 26 | 22 | 18 | 31 | — | 2 | 0.40 | 50-100 |
| Ex. 2-11 | A | #1000 | — | — | — | 2 | 2 | 2 | 0 | — | 3 | — | — |
| Ex. 2-12 | A | #1000 | 10 | 10 | 3 | 5 | — | — | — | — | 1 | — | — |
| Ex. 2-13 | A | #1000 | 10 | 10 | 3 | 7 | 6 | 6 | 14 | — | 3 | — | — |
| Ex. 2-14 | A | #1000 | 10 | 10 | 3 | 4 | 4 | 4 | 0 | — | 3 | — | — |
| Ex. 2-15 | A | #1000 | 10 | 5 | 3 | 6 | 6 | 6 | 0 | — | 3 | — | — |

TABLE 5

| | Glass composition | Surface-roughening step | Etching Step | | | Gloss 60° | | | | Size (mm) | Uniformity | Ra (μm) | Sm (μm) |
|---|---|---|---|---|---|---|---|---|---|---|---|---|---|
| | | | HF (mass %) | H$_2$SO$_4$ (mass %) | Time (min) | Maximum | Average value | Minimum | Difference (%) | | | | |
| Ex. 2-16 | A | #1000 | 10 | 0 | 4 | 6 | 6 | 5 | 17 | — | 2 | — | — |
| Ex. 2-17 | A | #1000 | 10 | 10 | 2.5 | 6 | 6 | 6 | 0 | — | 3 | — | — |
| Ex. 2-18 | B | #1000 | — | — | — | 1 | 1 | 1 | 0 | — | 3 | 0.526 | 15-25 |
| Ex. 2-19 | B | #1000 | 10 | 10 | 1 | 2 | 2 | 2 | 0 | — | 3 | 0.901 | 28 |
| Ex. 2-20 | B | #1000 | 10 | 10 | 2 | 3 | 3 | 3 | 0 | — | 3 | 0.74 | 28-33 |
| Ex. 2-21 | B | #1000 | 10 | 10 | 3 | 4 | 4 | 4 | 0 | — | 3 | 0.939 | 32-50 |
| Ex. 2-22 | B | #1000 | 10 | 10 | 4 | 5 | 5 | 5 | 0 | — | 3 | 0.792 | 29 |
| Ex. 2-23 | A | #1000 | — | — | — | 2 | 2 | 2 | 0 | 125 × 125 | 3 | 0.4 | 15 |
| Ex. 2-24 | A | #1000 | 10 | 10 | 3 | 9 | 9 | 8 | 11 | 125 × 125 | 3 | 0.46 | 30 |
| Ex. 2-25 | A | #1000 | 10 | 10 | 3 | 9 | 9 | 8 | 11 | 125 × 125 | 4 | 0.38 | 20 |
| Ex. 2-26 | A | #1000 | 10 | 10 | 2 | 5 | 5 | 5 | 0 | 125 × 125 | 2 | 0.46 | 25 |
| Ex. 2-27 | A | #1000 | 10 | 10 | 2 | 5 | 5 | 5 | 0 | 125 × 125 | 3 | 0.45 | 25 |
| Ex. 2-28 | A | #1000 | 10 | 10 | 2 | 5 | 5 | 5 | 0 | 125 × 125 | 2 | 0.51 | 25 |
| Ex. 2-29 | A | #1000 | 10 | 10 | 2 | 5 | 5 | 5 | 0 | 125 × 125 | 3 | 0.5 | 25 |
| Ex. 2-30 | A | #1000 | 10 | 10 | 3 | 8 | 8 | 7 | 13 | 125 × 125 | 3 | 0.49 | 30 |

TABLE 6

| | Glass composition | Surface-roughening step | Etching Step | | | Gloss 60° | | | | Size (mm) | Uniformity | Ra (μm) | Sm (μm) |
|---|---|---|---|---|---|---|---|---|---|---|---|---|---|
| | | | HF (mass %) | H$_2$SO$_4$ (mass %) | Time (min) | Maximum | Average value | Minimum | Difference (%) | | | | |
| Ex. 2-31 | A | #1000 | 10 | 10 | 3 | 8 | 8 | 7 | 13 | 125 × 125 | 3 | 0.44 | 30 |
| Ex. 2-32 | A | #1000 | 10 | 10 | 2 | 6 | 5 | 4 | 33 | 125 × 125 | 1 | 0.52 | 25 |
| Ex. 2-33 | A | #1000 | 10 | 10 | 2 | 5 | 5 | 4 | 20 | 125 × 125 | 3 | 0.51 | 25 |
| Ex. 2-34 | C | #3000 | — | — | — | 3 | 3 | 3 | 0 | — | — | — | — |
| Ex. 2-35 | C | #3000 | 20 | 10 | 5 | — | — | — | — | 40 × 20 | 1 | — | — |
| Ex. 2-36 | C | #3000 | 20 | 10 | 7 | — | — | — | — | 40 × 20 | 1 | — | — |
| Ex. 2-37 | C | #3000 | 20 | 10 | 9 | — | — | — | — | 40 × 20 | 1 | — | — |
| Ex. 2-38 | C | #3000 | 20 | 10 | 8 | 15 | 14 | 13 | 13 | 40 × 20 | 3 | — | — |
| Ex. 2-39 | C | #3000 | 20 | 10 | 6 | 14 | 13 | 12 | 14 | 40 × 20 | 3 | — | — |
| Ex. 2-40 | C | #3000 | 20 | 10 | 5 | 13 | 13 | 13 | 0 | 40 × 40 | 3 | — | — |
| Ex. 2-41 | D | #3000 | 20 | 10 | 4.5 | 8 | 8 | 8 | 0 | 40 × 40 | 3 | — | — |
| Ex. 2-42 | D | #3000 | 20 | 10 | 6.5 | 10 | 10 | 10 | 0 | 40 × 41 | 3 | — | — |
| Ex. 2-43 | D | #3000 | 20 | 10 | 7.5 | 11 | 11 | 11 | 0 | 40 × 42 | 3 | — | — |
| Ex. 2-44 | E | #3000 | — | — | — | 3 | 3 | 3 | 0 | 40 × 43 | 3 | 0.293 | 14 |
| Ex. 2-45 | E | #3000 | 20 | 10 | 5 | 8 | 8 | 8 | 0 | 40 × 44 | 3 | 0.483 | 25-35 |

TABLE 7

| | Glass composition | Surface-roughening step | Etching Step HF (mass %) | Etching Step H₂SO₄ (mass %) | Etching Step Time (min) | Gloss 60° Maximum | Gloss 60° Average value | Gloss 60° Minimum | Difference (%) | Size (mm) | Uniformity | Ra (μm) | Sm (μm) |
|---|---|---|---|---|---|---|---|---|---|---|---|---|---|
| Ex. 2-46 | E | #3000 | 20 | 10 | 7 | 10 | 10 | 10 | 0 | — | 3 | 0.439 | 30-40 |
| Ex. 2-47 | E | #3000 | 20 | 10 | 9 | 13 | 13 | 13 | 0 | — | 3 | 0.412 | 45 |
| Ex. 2-48 | A | #1000 | — | — | — | 2 | 2 | 2 | 0 | — | 3 | 0.48 | 15-20 |
| Ex. 2-49 | A | #1000 | 5 | 0 | 1 | 1 | 1 | 1 | 0 | — | 3 | 0.95 | 20 |
| Ex. 2-50 | A | #1000 | 5 | 0 | 3 | 2 | 2 | 2 | 0 | — | 3 | 0.88 | 25 |
| Ex. 2-51 | A | #1000 | 5 | 10 | 1 | 3 | 3 | 3 | 0 | — | 3 | 0.79 | 30 |
| Ex. 2-52 | A | #1000 | 5 | 10 | 3 | 3 | 3 | 3 | 0 | — | 3 | 0.74 | 30 |
| Ex. 2-53 | A | #1000 | 10 | 10 | 4.5 | 5 | 5 | 5 | 0 | 50 × 50 | 2 | — | — |
| Ex. 2-54 | A | #1000 | 10 | 10 | 4.5 | 7 | 7 | 7 | 0 | 50 × 50 | 3 | — | — |
| Ex. 2-55 | A | #1000 | 10 | 10 | 4 | 4 | 4 | 4 | 0 | 50 × 50 | 3 | — | — |
| Ex. 2-56 | A | #1000 | 10 | 10 | 4 | 4 | 4 | 4 | 0 | 50 × 50 | 3 | — | — |
| Ex. 2-57 | A | #1000 | 10 | 10 | 4 | 4 | 4 | 4 | 0 | 50 × 50 | 3 | — | — |
| Ex. 2-58 | A | #1000 | 10 | 10 | 4 | 4 | 4 | 4 | 0 | 50 × 50 | 3 | — | — |
| Ex. 2-59 | A | #1000 | 10 | 10 | 4 | 4 | 4 | 4 | 0 | 50 × 50 | 3 | — | — |
| Ex. 2-60 | A | #1000 | 10 | 10 | 4 | 4 | 4 | 4 | 0 | 50 × 50 | 3 | — | — |

TABLE 8

| | Glass composition | Surface-roughening step | Etching Step HF (mass %) | Etching Step H₂SO₄ (mass %) | Etching Step Time (min) | Gloss 60° Maximum | Gloss 60° Average value | Gloss 60° Minimum | Difference (%) | Size (mm) | Uniformity | Ra (μm) | Sm (μm) |
|---|---|---|---|---|---|---|---|---|---|---|---|---|---|
| Ex. 2-61 | A | #1000 | 10 | 10 | 4.3 | 5 | 5 | 5 | 0 | 50 × 50 | 3 | — | — |
| Ex. 2-62 | A | #1000 | 10 | 10 | 4.3 | 6 | 6 | 6 | 0 | 50 × 50 | 3 | — | — |
| Ex. 2-63 | A | #1000 | 10 | 10 | 4.3 | 6 | 6 | 6 | 0 | 50 × 50 | 2 | — | — |
| Ex. 2-64 | A | #1000 | 10 | 10 | 4.3 | 5 | 5 | 5 | 0 | 50 × 50 | 3 | — | — |
| Ex. 2-65 | A | #1000 | 10 | 10 | 4.3 | 5 | 5 | 5 | 0 | 50 × 50 | 3 | — | — |
| Ex. 2-66 | A | #1000 | 10 | 10 | 4.3 | 5 | 5 | 5 | 0 | 50 × 50 | 3 | — | — |
| Ex. 2-67 | A | #1000 | 10 | 10 | 4 | 12 | 12 | 12 | 0 | 50 × 50 | — | — | — |
| Ex. 2-68 | A | #1000 | 10 | 10 | 4 | 13 | 13 | 13 | 0 | 50 × 50 | — | — | — |
| Ex. 2-69 | A | #1000 | 10 | 10 | 4 | 13 | 13 | 13 | 0 | 50 × 50 | — | — | — |
| Ex. 2-70 | A | #1000 | 10 | 10 | 4 | 13 | 13 | 13 | 0 | 50 × 50 | — | — | — |
| Ex. 2-71 | A | #1000 | 10 | 10 | 4 | 12 | 12 | 12 | 0 | 50 × 50 | — | — | — |
| Ex. 2-72 | A | #1000 | 10 | 10 | 4 | 13 | 13 | 13 | 0 | 50 × 50 | — | — | — |
| Ex. 2-73 | A | #1000 | 10 | 10 | 4 | 6 | 6 | 6 | 0 | 50 × 50 | — | — | — |
| Ex. 2-74 | A | #1000 | 10 | 10 | 4 | 6 | 6 | 6 | 0 | 50 × 50 | — | — | — |
| Ex. 2-75 | A | #1000 | 10 | 10 | 4 | 6 | 6 | 6 | 0 | 50 × 50 | — | — | — |

TABLE 9

| | Glass composition | Surface-roughening step | Etching Step HF (mass %) | Etching Step H₂SO₄ (mass %) | Etching Step Time (min) | Gloss 60° Maximum | Gloss 60° Average value | Gloss 60° Minimum | Difference (%) | Size (mm) | Uniformity | Ra (μm) | Sm (μm) |
|---|---|---|---|---|---|---|---|---|---|---|---|---|---|
| Ex. 2-76 | A | #1000 | 10 | 10 | 4 | 5 | 5 | 5 | 0 | 50 × 50 | — | — | — |
| Ex. 2-77 | A | #1000 | 10 | 10 | 4 | 5 | 5 | 5 | 0 | 50 × 50 | — | — | — |
| Ex. 2-78 | A | #1000 | 10 | 10 | 4 | 6 | 6 | 6 | 0 | 50 × 50 | — | — | — |
| Ex. 2-79 | A | #3000 | 10 | 10 | 4 | 8 | 8 | 8 | 0 | 50 × 50 | — | — | — |
| Ex. 2-80 | A | #3000 | 10 | 10 | 4 | 8 | 8 | 8 | 0 | 50 × 50 | — | — | — |
| Ex. 2-81 | A | #3000 | 10 | 10 | 4 | 8 | 8 | 8 | 0 | 50 × 50 | — | — | — |
| Ex. 2-82 | A | #3000 | 10 | 10 | 4 | 7 | 7 | 7 | 0 | 50 × 50 | — | — | — |
| Ex. 2-83 | A | #3000 | 10 | 10 | 4 | 8 | 8 | 8 | 0 | 50 × 50 | — | — | — |
| Ex. 2-84 | A | #3000 | 10 | 10 | 4 | 8 | 8 | 8 | 0 | 50 × 50 | — | — | — |
| Ex. 2-85 | A | #3000 | 10 | 10 | 4 | 11 | 11 | 11 | 0 | 50 × 50 | — | — | — |
| Ex. 2-86 | A | #3000 | 10 | 10 | 4 | 11 | 11 | 11 | 0 | 50 × 50 | — | — | — |
| Ex. 2-87 | A | #3000 | 10 | 10 | 4 | 11 | 11 | 11 | 0 | 50 × 50 | — | — | — |
| Ex. 2-88 | A | #3000 | 10 | 10 | 4 | 11 | 11 | 11 | 0 | 50 × 50 | — | — | — |
| Ex. 2-89 | A | #3000 | 10 | 10 | 4 | 10 | 10 | 10 | 0 | 50 × 50 | — | — | — |
| Ex. 2-90 | A | #3000 | 10 | 10 | 4 | 11 | 11 | 11 | 0 | 50 × 50 | — | — | — |

TABLE 10

| | Glass composition | Surface-roughening step | Etching Step HF (mass %) | H₂SO₄ (mass %) | Time (min) | Gloss 60° Maximum | Average value | Minimum | Difference (%) | Size (mm) | Uniformity | Ra (μm) | Sm (μm) |
|---|---|---|---|---|---|---|---|---|---|---|---|---|---|
| Ex. 2-91 | A | #3000 | 10 | 10 | 4 | 11 | 11 | 11 | 0 | 50 × 50 | — | — | — |
| Ex. 2-92 | A | #3000 | 10 | 10 | 4 | 10 | 10 | 10 | 0 | 50 × 50 | — | — | — |
| Ex. 2-93 | A | #3000 | 10 | 10 | 4 | 11 | 11 | 11 | 0 | 50 × 50 | — | — | — |
| Ex. 2-94 | A | #3000 | 10 | 10 | 4 | 11 | 11 | 11 | 0 | 50 × 50 | — | — | — |
| Ex. 2-95 | A | #3000 | 10 | 10 | 4 | 11 | 11 | 11 | 0 | 50 × 50 | — | — | — |
| Ex. 2-96 | A | #3000 | 10 | 10 | 4 | 11 | 11 | 11 | 0 | 50 × 50 | — | — | — |
| Ex. 2-97 | A | #3000 | 10 | 10 | 4 | 10 | 10 | 10 | 0 | 50 × 50 | — | — | — |
| Ex. 2-98 | A | #3000 | 10 | 10 | 4 | 10 | 10 | 10 | 0 | 50 × 50 | — | — | 18-19 |
| Ex. 2-99 | A | #3000 | 10 | 10 | 4 | 10 | 10 | 10 | 0 | 50 × 50 | — | — | — |
| Ex. 2-100 | A | #600 | 10 | 10 | 4 | 4 | 4 | 4 | 0 | 50 × 50 | — | — | — |
| Ex. 2-101 | A | #600 | 10 | 10 | 4 | 4 | 4 | 4 | 0 | 50 × 50 | — | — | — |
| Ex. 2-102 | A | #600 | 10 | 10 | 4 | 4 | 4 | 4 | 0 | 50 × 50 | — | — | — |
| Ex. 2-103 | A | #600 | 10 | 10 | 4 | 4 | 4 | 4 | 0 | 50 × 50 | — | — | — |
| Ex. 2-104 | A | #600 | 10 | 10 | 4 | 4 | 4 | 4 | 0 | 50 × 50 | — | — | — |
| Ex. 2-105 | A | #600 | 10 | 10 | 4 | 4 | 4 | 4 | 0 | 50 × 50 | — | — | — |

TABLE 11

| | Glass composition | Surface-roughening step | Etching Step HF (mass %) | H₂SO₄ (mass %) | Time (min) | Gloss 60° Maximum | Average value | Minimum | Difference (%) | Size (mm) | Uniformity | Ra (μm) | Sm (μm) |
|---|---|---|---|---|---|---|---|---|---|---|---|---|---|
| Ex. 2-106 | A | #600 | 10 | 10 | 4 | 3 | 3 | 3 | 0 | 50 × 50 | — | — | — |
| Ex. 2-107 | A | #600 | 10 | 10 | 4 | 3 | 3 | 3 | 0 | 50 × 50 | — | — | — |
| Ex. 2-108 | A | #600 | 10 | 10 | 4 | 3 | 3 | 3 | 0 | 50 × 50 | — | — | 21-24 |
| Ex. 2-109 | A | #600 | 10 | 10 | 4 | 3 | 3 | 3 | 0 | 50 × 50 | — | — | — |
| Ex. 2-110 | A | #600 | 10 | 10 | 4 | 3 | 3 | 3 | 0 | 50 × 50 | — | — | — |
| Ex. 2-111 | A | #600 | 10 | 10 | 4 | 3 | 3 | 3 | 0 | 50 × 50 | — | — | — |
| Ex. 2-112 | A | #600 | 10 | 10 | 4 | 4 | 4 | 4 | 0 | 50 × 50 | — | — | — |
| Ex. 2-113 | A | #600 | 10 | 10 | 4 | 3 | 3 | 3 | 0 | 50 × 50 | — | — | — |
| Ex. 2-114 | A | #600 | 10 | 10 | 4 | 3 | 3 | 3 | 0 | 50 × 50 | — | — | — |
| Ex. 2-115 | A | #600 | 10 | 10 | 4 | 3 | 3 | 3 | 0 | 50 × 50 | — | — | — |
| Ex. 2-116 | A | #600 | 10 | 10 | 4 | 3 | 3 | 3 | 0 | 50 × 50 | — | — | — |
| Ex. 2-117 | A | #600 | 10 | 10 | 4 | 3 | 3 | 3 | 0 | 50 × 50 | — | — | — |
| Ex. 2-118 | A | #600 | 10 | 10 | 4 | 4 | 4 | 4 | 0 | 50 × 50 | — | — | — |
| Ex. 2-119 | A | #600 | 10 | 10 | 4 | 4 | 4 | 4 | 0 | 50 × 50 | — | — | — |
| Ex. 2-120 | A | #600 | 10 | 10 | 4 | 4 | 4 | 4 | 0 | 50 × 50 | — | — | — |
| Ex. 2-121 | G | #1000 | 20 | 10 | 5 | 9 | 9 | 9 | 0 | 40 × 40 | — | — | — |

TABLE 12

| | Glass composition | Etching treatment (1) HF (mass %) | H₂SO₄ (mass %) | Time (min) | Etching treatment (2) HF (mass %) | Additive | Time (min) | Etching treatment (3) HF (mass %) | H₂SO₄ (mass %) | Time (min) |
|---|---|---|---|---|---|---|---|---|---|---|
| Ex. 2-122 | E | 2.5 | 0 | 1 | 10 | KF: 10 mass % | 1 | 5 | 0 | 0.1 |
| Ex. 2-123 | F | 1 | 10 | 1 | 10 | KF: 10 mass % | 1 | 5 | 0 | 0.5 |
| Ex. 2-124 | F | 2.5 | 0 | 1 | 10 | KF: 10 mass % | 1 | 5 | 0 | 1 |
| Ex. 2-125 | E | 2.5 | 0 | 1 | 20 ml | NH₄F: 20 g | 1 | 20 | 0 | 1 |
| Ex. 2-126 | F | 2.5 | 0 | 1 | 20 ml | NH₄F: 20 g | 1 | 20 | 0 | 1 |
| Ex. 2-127 | E | 2.5 | 0 | 1 | 80 ml | NH₄F: 40 g | 1 | 20 | 0 | 1 |
| Ex. 2-128 | E | 2.5 | 0 | 1 | 80 ml | NH₄F: 40 g + glass cullet: 0.5 g | 1 | 20 | 0 | 1 |
| Ex. 2-129 | E | 2.5 | 0 | 1 | 80 ml | NH₄F: 40 g + glass cullet: 1 g | 1 | 20 | 0 | 1 |
| Ex. 2-130 | E | 2.5 | 0 | 1 | 80 ml | NH₄F: 40 g + glass cullet: 1.2 g | 1 | 20 | 0 | 1 |
| Ex. 2-131 | E | 2.5 | 5 | 0.1 | 80 ml | NH₄F: 40 g + glass cutlet: 1.2 g | 1 | — | — | — |
| Ex. 2-132 | E | 2.5 | 5 | 0.1 | 80 ml | NH₄F: 40 g + glass cullet: 1.2 g | 1 | 20 | 0 | 0.5 |

| | Gloss 60° Maximum | Average Value | Minimum | Difference (%) | Size (mm) | Uniformity | Ra (μm) | Sm (μm) |
|---|---|---|---|---|---|---|---|---|
| Ex. 2-122 | 8 | 8 | 8 | 0 | 20 × 20 | 2 | 0.19 | — |
| Ex. 2-123 | 14 | 14 | 13 | 7 | 20 × 20 | 2 | 0.16 | 10 |

TABLE 12-continued

| | | | | | | | | |
|---|---|---|---|---|---|---|---|---|
| Ex. 2-124 | 15 | 15 | 14 | 7 | 20 × 20 | 2 | 0.13 | 10 |
| Ex. 2-125 | 13 | 10 | 7 | 46 | 20 × 20 | 1 | 1.5 | 55 |
| Ex. 2-126 | 14 | 10 | 6 | 57 | 20 × 20 | 1 | 0.48 | 30 |
| Ex. 2-127 | 31 | 16 | 1 | 97 | 20 × 20 | 1 | — | — |
| Ex. 2-128 | 65 | 39 | 13 | 80 | 20 × 20 | 1 | — | — |
| Ex. 2-129 | 32 | 20 | 7 | 78 | 20 × 20 | 1 | — | — |
| Ex. 2-130 | 36 | 22 | 8 | 78 | 20 × 20 | 1 | — | — |
| Ex. 2-131 | <1 | <1 | <1 | n/a | 20 × 20 | 3 | 0.92 | 13 |
| Ex. 2-132 | 3 | 3 | 3 | 0 | 20 × 20 | 3 | 1.1 | 13 |

TABLE 13

| | Glass composition | Etching treatment (1) | | | Etching treatment (2) | | | Etching treatment (3) | | |
|---|---|---|---|---|---|---|---|---|---|---|
| | | HF (mass %) | $H_2SO_4$ (mass %) | Time (min) | HF (mass %) | Additive | Time (min) | HF (mass %) | $H_2SO_4$ (mass %) | Time (min) |
| Ex. 2-133 | E | 2.5 | 5 | 0.1 | 80 ml | $NH_4F$: 40 g + glass cullet: 1.2 g | 1 | 20 | 0 | 2 |
| Ex. 2-134 | E | 2.5 | 5 | 0.1 | 80 ml | $NH_4F$: 40 g + glass cullet: 1.2 g | 1 | 20 | 0 | 3 |
| Ex. 2-135 | E | 2.5 | 5 | 0.1 | 80 ml | $NH_4F$: 40 g + glass cullet: 1.2 g | 1 | 20 | 0 | 4 |
| Ex. 2-136 | F | 2.5 | 5 | 0.1 | 80 ml | $NH_4F$: 40 g + glass cullet: 1.2 g | 1 | 20 | 0 | 5 |
| Ex. 2-137 | A | 2.5 | 5 | 0.1 | 80 ml | $NH_4F$: 40 g + glass cullet: 1.2 g | 1 | 20 | 0 | 5 |
| Ex. 2-138 | E | 2.5 | 5 | 0.1 | 120 ml | $NH_4F$: 60 g + glass cullet: 2.5 g | 1 | 20 | 0 | 5 |
| Ex. 2-139 | E | 2.5 | 5 | 0.1 | 120 ml | $NH_4F$: 60 g + glass cullet: 2.5 g | 1 | 20 | 0 | 4 |
| Ex. 2-140 | E | 2.5 | 5 | 0.1 | 120 ml | $NH_4F$: 60 g + glass cullet: 2.5 g | 1 | 20 | 0 | 3 |
| Ex. 2-141 | F | 2.5 | 5 | 0.1 | 120 ml | $NH_4F$: 60 g + glass cullet: 2.5 g | 1 | 20 | 0 | 2 |
| Ex. 2-142 | F | 2.5 | 5 | 0.1 | 120 ml | $NH_4F$: 60 g + glass cullet: 2.5 g | 1 | 20 | 0 | 3 |
| Ex. 2-143 | A | 2.5 | 5 | 0.1 | 120 ml | $NH_4F$: 60 g + glass cullet: 2.5 g | 60 | 20 | 0 | 2 |
| Ex. 2-144 | A | 2.5 | 5 | 0.1 | 120 ml | $NH_4F$: 60 g + glass cullet: 2.5 g | 60 | 20 | 0 | 3 |

| | Gloss 60° | | | | | | | |
|---|---|---|---|---|---|---|---|---|
| | Maximum | Average Value | Minimum | Difference (%) | Size (mm) | Uniformity | Ra (µm) | Sm (µm) |
| Ex. 2-133 | 2 | 2 | 2 | 0 | 20 × 20 | 3 | 1 | 18 |
| Ex. 2-134 | 2 | 2 | 2 | 0 | 20 × 20 | 3 | 0.82 | 25 |
| Ex. 2-135 | 4 | 4 | 4 | 0 | 20 × 20 | 3 | 0.83 | 30 |
| Ex. 2-136 | 9 | 9 | 9 | 0 | 20 × 20 | 3 | 0.53 | 40 |
| Ex. 2-137 | 19 | 19 | 18 | 5 | 20 × 20 | 3 | 0.42 | 60 |
| Ex. 2-138 | 1 | <1 | <1 | n/a | 20 × 20 | 1 | — | — |
| Ex. 2-139 | 1 | <1 | <1 | n/a | 20 × 20 | 2 | — | — |
| Ex. 2-140 | 1 | <1 | <1 | n/a | 20 × 20 | 2 | — | — |
| Ex. 2-141 | 3 | 3 | 3 | 0 | 20 × 20 | 3 | — | — |
| Ex. 2-142 | 6 | 6 | 6 | 0 | 20 × 20 | 3 | — | — |
| Ex. 2-143 | 5 | 5 | 5 | 0 | 20 × 20 | 2 | — | — |
| Ex. 2-144 | 7 | 7 | 7 | 0 | 20 × 20 | 2 | — | — |

The results shown in Tables 4 to 13 have revealed that by adjusting the gloss value to 30 or less and the ratio of the difference between the maximum gloss value and the minimum gloss value to the maximum gloss value when measured at 9 points in the surface thereof in a 125 mm square glass to 20% or less, the influence of the reflected colors in the colored glass is effectively suppressed to show excellent uniformity.

What is claimed is:

1. A colored glass, comprising
   at least one coloring component selected from the group consisting of oxides of Co, Mn, Fe, Ni, Cu, Cr, V, Bi, Se, Ti, Ce, Er and Nd,
   wherein
   a surface layer of the colored glass is roughened in whole or in part to obtain a roughened surface layer,
   an average value of gloss values measured at 9 points in the roughened surface layer at an incident angle of 60° in accordance with JIS Z8741 (1991) is 30 or less,
   a ratio of a difference between a maximum gloss value and a minimum gloss value to the maximum gloss value is 20% or less, and
   a minimum value of visible-light transmittance at a thickness of 0.8 mm is 70% or less.

2. The colored glass according to claim 1, wherein the roughened surface layer has a surface roughness Ra measured in accordance with JIS B0633 (2001) of from 0.2 to 1 µm.

3. The colored glass according to claim 1, wherein a maximum value of an absorption coefficient to a light having a wavelength of 380 to 780 nm is 0.1 $mm^{-1}$ or more.

4. The colored glass according to claim 1, comprising a compressive stress layer in the roughened surface layer.

5. The colored glass according to claim 1, wherein a total content of the at least one coloring component is from 0.1 to 7%.

6. The colored glass according to claim 1, which is configured to enclose an electronic device.

7. The colored glass according to claim 6, wherein the electronic device is a portable electronic device.

8. A portable electronic device, comprising
   the colored glass according to claim 1,
   wherein the colored glass is configured to enclose the portable electronic device.

9. A method for producing the colored glass according to claim 1, the method comprising:
- roughening the surface layer of the glass in whole or in part to obtain the roughened surface layer; and
- etching the roughened surface layer.

10. The method according to claim 9, wherein said roughening comprises
- polishing the surface layer using an abrasive or sandblasting the surface layer.

11. The method according to claim 9, wherein said roughening comprises
- dipping the surface layer in an etching liquid.

12. The method according to claim 9, wherein said etching comprises
- dipping the roughened surface in an etching liquid containing at least one selected from the group consisting of hydrofluoric acid, hexafluorosilicic acid and buffered hydrofluoric acid.

\* \* \* \* \*